United States Patent
Reynolds et al.

(10) Patent No.: US 6,965,934 B1
(45) Date of Patent: Nov. 15, 2005

(54) ENCAPSULATION PROTOCOL FOR LINKING STORAGE AREA NETWORKS OVER A PACKET-BASED NETWORK

(75) Inventors: Robert A. Reynolds, Pflugerville, TX (US); John B. Haechten, Buda, TX (US); Kenneth D. Smeltzer, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 853 days.

(21) Appl. No.: 09/709,807

(22) Filed: Nov. 10, 2000

Related U.S. Application Data

(60) Provisional application No. 60/165,194, filed on Nov. 12, 1999.

(51) Int. Cl.[7] .............................................. G06F 15/16
(52) U.S. Cl. .................................................... 709/224
(58) Field of Search .............................. 709/224, 230; 714/25

(56) References Cited

U.S. PATENT DOCUMENTS

| | | | | |
|---|---|---|---|---|
| 5,390,326 A | * | 2/1995 | Shah | 370/222 |
| 5,519,695 A | | 5/1996 | Purohit et al. | 370/58.2 |
| 5,768,623 A | | 6/1998 | Judd et al. | 395/857 |
| 5,925,119 A | | 7/1999 | Maroney | 710/126 |
| 5,941,972 A | | 8/1999 | Hoese et al. | 710/129 |
| 5,959,994 A | | 9/1999 | Boggs et al. | 370/399 |
| 5,978,875 A | | 11/1999 | Asano et al. | 710/107 |
| 6,061,723 A | * | 5/2000 | Walker et al. | 709/224 |
| 6,216,168 B1 | * | 4/2001 | Dev et al. | 709/245 |
| 6,272,551 B1 | * | 8/2001 | Martin et al. | 709/250 |
| 6,738,821 B1 | * | 5/2004 | Wilson et al. | 709/230 |

* cited by examiner

*Primary Examiner*—David Y. Eng
(74) *Attorney, Agent, or Firm*—Sprinkle IP Law Group

(57) ABSTRACT

A method and system are disclosed for encapsulating SCSI protocol for data transmission between two or more nodes across a packet-based network. The method of the present invention includes the steps of, at each node in the network, identifying all other available nodes on the network, and the remote devices attached to those nodes; representing one or more of the attached remote devices such that they are made available to the node's local hosts; encapsulating the I/O phases between one or more local hosts and one or more of the remote devices; and repeating the encapsulating step for subsequent I/Os between one or more hosts and one or more devices. The step of encapsulating I/O phases between a local host and a remote device can further comprise encapsulating task management functions, error recovery functions and normal I/O processing functions. Each node can be a Fibre Channel-to-SCSI router.

97 Claims, 1 Drawing Sheet

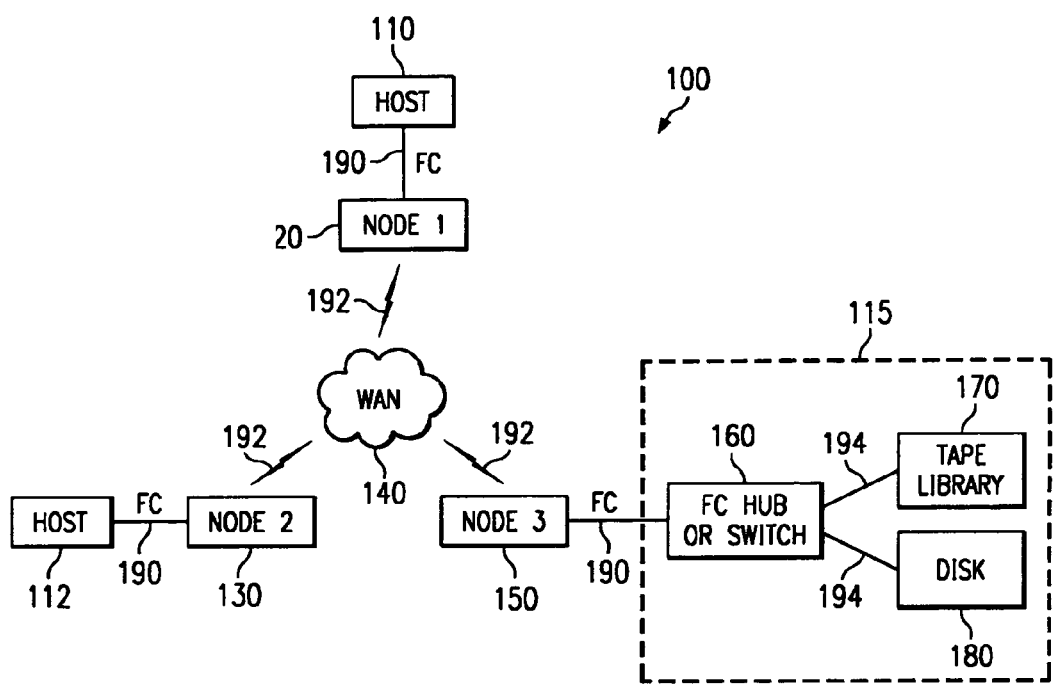

ENCAPSULATION PROTOCOL FOR LINKING STORAGE AREA NETWORKS OVER A PACKET-BASED NETWORK

This application claims the benefit of U.S. Provisional Application 60/165,194, which was filed on Nov. 12, 1999 and is hereby incorporated in reference herein.

TECHNICAL FIELD OF THE INVENTION

This invention relates generally to data and information communications systems and their operation, and, more particularly, to the field of storage area networking. Even more particularly, the present invention relates to Fibre Channel Storage Area Networks (SANs) and an encapsulation protocol for linking Storage Area Networks over a packet-based network.

BACKGROUND OF THE INVENTION

Dramatic growth in the amount of data that must be stored, combined with the need for faster, more reliable and more efficient data access and data management capabilities, have led many organizations to seek an improved way of storing, accessing and managing data. In traditional computer networks, each storage device is connected to only one server, and can be accessed only by that server. The computer protocol used to connect and transfer data between the server and storage device is called the small computer system interface, or SCSI. As more data must be stored and retrieved, organizations increasingly are finding that this one-to-one, or point-to-point, connection is not sufficiently fast, efficient and reliable to support growing demands for data access and storage. In addition, in most organizations today, data back-up—or creating a duplicate copy of data to protect it from corruption or loss—is accomplished by moving large volumes of stored data from a dedicated storage device over the primary computer network to a back-up storage device. Since the primary computer network also is responsible for conducting day-to-day computer operations, this added data movement results in substantial congestion, slowing day-to-day computer operations.

Storage area networks, or SANs, which are computer networks dedicated to data storage, can help resolve some of these problems. A storage area network uses a different, higher-performance computer protocol, known as Fibre Channel, to transfer data. A storage area network also removes the one-to-one connection between servers and storage devices, and instead allows many servers to connect to and share access with many storage devices. The many-to-many connection enabled by the storage area network, combined with the Fibre Channel protocol, permits faster, more efficient, more reliable and more manageable data transfer processes. Furthermore, the storage area network has the potential to enable data back-up to be accomplished over it, instead of over the primary computer network, thus substantially reducing congestion on the primary computer network and allowing much more efficient day-to-day operations.

Most storage devices in the market, however, continue to be sold with the small computer system interface. Additionally, most organizations have made significant investments in storage devices and servers that use the small computer system interface. Therefore, in order for devices of a storage area network that use Fibre Channel to function with storage devices that use SCSI, storage routers must be installed between these devices. In particular, storage routers are essential to shifting data back-up processes from a primary computer network to the storage area network, since most data back-up storage devices use the SCSI interface and can only connect to the storage area network through a storage router. As new computer protocols are introduced, storage routers will be increasingly essential to enable rapid, seamless communication among servers, storage devices and storage area network devices that use diverse protocols.

However, typical SANs are local Fibre Channel networks that serve one particular organization or one particular site. These SANs can be quite large, but cannot span great distances as they have distance limitations imposed upon them by the infrastructure necessary to carry Fibre Channel. For example, the Fibre Channel standard defines a means to communicate over spans up to 10 km and, in some cases, up to 30 km in length. In order to do this, however, the organization implementing the Fibre Channel network must typically own the fiber or lease dark fiber from some other party, which can be very expensive and, in most cases, is cost prohibitive.

This is because the fibers used to carry Fibre Channel traffic can only carry Fibre Channel protocol traffic. They cannot be shared with other protocols. It is therefore more cost effective to transmit data over long distances using a protocol that can be carried over already existing networks, such as those owned by phone companies that can carry ATM traffic, SONET traffic and IP traffic. Therefore, SANs are usually limited as to the geographic area that they can serve (i.e., they are limited to local operation). Furthermore, two or more geographically diverse SANs cannot interconnect in a seamless fashion such that they operate and behave as if they were local to one another because the infrastructure to connect them does not exist or is cost prohibitive.

SUMMARY OF THE INVENTION

Therefore, a need exists for a method and system to connect multiple local SANs over distances greater than those currently available with the Fibre Channel Protocol, such as would be required to support a corporate or global storage area network solution.

Still further, a need exists for an encapsulation protocol with the ability to use existing telecommunications networks t connect multiple storage area networks over a packet-based network protocol such as IP, ATM, SONET, or other such currently existing telecommunications protocol.

Even further, a need exists for an encapsulation protocol that can link multiple storage area networks over a packet-based network in a seamless fashion, such that the SANs operate and behave as if they were local to one another.

The present invention provides an encapsulation protocol method and system for linking of multiple SANs over a packet-based network that substantially eliminates or reduces the disadvantages and problems associated with use of a Fibre Channel protocol over large distances. In particular, the present invention provides a means for seamlessly interconnecting geographically distinct SANs such that they operate as if they were local to one another.

In particular, the present invention provides a method and system for encapsulating SCSI protocol for data transmission between two or more nodes across a packet-based network. The method of the present invention includes the steps of, at each node in the network, identifying all other available nodes on the network, and the remote devices attached to those nodes; representing one or more of the attached remote devices such that they are made available to the node's local hosts; encapsulating the I/O phases between one or more local hosts and one or more of the remote devices; and repeating the encapsulating step for subsequent I/Os between one or more hosts and one or more devices. The step of encapsulating I/O phases between a local host and a remote device can further comprise encapsulating task management functions, error recovery functions and normal I/O processing functions. Each node can be a Fibre Channel-to-SCSI router.

The present invention provides an important technical advantage of a method and system to connect multiple local SANs over long distances greater than those currently allowable under the Fibre Channel Protocol, such as would be necessary to support a corporate or global storage area network solution.

Further still, the present invention provides an important technical advantage of an encapsulation protocol with the ability to use existing telecommunications networks to connect multiple storage area networks over a packet-based network protocol, such as IP, ATM, SONET, or other such currently existing telecommunications protocol.

The present invention provides yet another important technical advantage of an encapsulation protocol that can link multiple storage area networks over a packet-based network in a seamless fashion, such that the multiple SANs operate as a single unified SAN.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 1 is a simplified block diagram illustrating one implementation of the method and system of this invention within a typical SAN environment.

DETAILED DESCRIPTION OF THE INVENTION

An embodiment of the present invention is illustrated in the FIGURE, like numerals being used to refer to like and corresponding parts of the drawing.

The present invention provides a method and system for encapsulating SCSI protocol for transmission between one or more nodes across a packet-based network that takes advantage of existing telecommunication networks to efficiently and cost-effectively connect multiple, and perhaps and geographically diverse SANs, such that they can operate as a single storage area network. The method and system of this invention can thus effectively overcome distance limitations of existing Fibre Channel networks so that the SAN model can be extended to many SANs, over many miles. The present invention could, for example, link a corporate SAN in Los Angeles to another corporate SAN in New York or Tokyo. In the case of storage recovery, this invention will allow a back-up library to reside off-site at a remote location, thus ensuring data integrity should the local location be damaged by disaster, like fire or flood. SANs implementing the present invention need not be limited to local use only.

To connect local SANs over greater distances than allowed under the Fiber Channel protocol, the present invention defines an encapsulation protocol (EP) that can run the Fibre Channel protocol (FCP) in such a way that it can travel over any packet-based transport, such as an Asynchronous Transfer Mode ("ATM") or Ethernet network. FIG. 1 is a simplified block diagram illustrating one implementation of the method and system of this invention within a typical SAN environment. Network 100 of FIG. 1 includes remote hosts 110, which can be local Fibre Channel SANs that access another local Fibre Channel SAN 115 for tape back-up and disk mirroring, for example. Fibre Channel hosts 110 and Fibre Channel host 115 are attached to nodes 120, 130 and 150, respectively, which can be Fibre Channel-to-SCSI routers, such as those manufactured and sold by Crossroads Systems, Inc. Nodes 120, 130 and 150 can be interfaces to the rest of the network 100 for SANs 110 and 115.

The Fibre Channel-to-SCSI routers that comprise nodes 120, 130 and 150 all can implement the EP layer such that the Fibre Channel protocol flows seamlessly over the packet-based WAN (wide area network) 140. WAN 140 represents a physical packet-based transport such as ATM or Ethernet. WAN 140 can be a dedicated link or switched network. Hosts 110 and 115 are connected to their respective nodes via Fibre Channel links 190. Nodes 120, 130 and 150 are each connected to WAN 140 via network links 192. Fibre Channel links 190 can be copper or fiber-optic links, as required for a given application. Network links 192 can similarly be copper or fiber-optic, as needed.

Remote host 110 and local host 115 can be comprised of multiple targets and multiple initiators. For example, SAN 115 includes Fibre Channel hub (switch) 160, tape library 170 and disk 180. Although only tape library 170 and disk 180 are shown, multiple initiators and target devices can be attached to Fibre Channel hub 160 and through it to Fibre Channel-to-SCSI router 150. Fibre Channel SAN 115 can thus comprise multiple hosts and multiple initiators.

Connecting two or more SANs together using an extender protocol, such as the encapsulation protocol of this invention, requires mapping the local address of each SCSI device on one SAN to an intermediate address to get the extender, and then mapping each intermediate address into a remote address on the remote SAN. This mapping is required to allow initiators on one SAN to address SCSI devices on the remote SAN as if they were SCSI devices on the local SAN to which the initiator is attached. In this way, devices on the remote SAN can be represented in such a way that they are made available to initiators on other SANs. Related patent application entitled "Method and System for Mapping Addressing of SCSI Devices Between Storage Area Networks," Ser. No. 09/710,213, filed on Nov. 10, 2000, discloses a method and system for mapping addresses of SCSI devices between two or more SANs connected by a SAN extender, such as the encapsulation protocol of this invention. This application is hereby incorporated by reference in its entirety as disclosing one compatible method for mapping addresses of SCSI devices between two SANS that can be used with the present invention.

According to one embodiment, to accomplish mapping, a node, such as target node 150 can, for example, map address information for each attached device to a unique target generic identifier. For example, if a tape library and disk have FC addresses 0x1 and 0x2, respectively, the tape library has two logical unit identifiers (LUNs) of 0 and 1, the disk has a single LUN of 0, then the following table can be create to map the SCSI device addresses to target generic identifiers.

TABLE 1

| Target Generic Identifier | FC Device Address | LUN Identifier |
|---|---|---|
| 0 | 0x1 | 0 |
| 1 | 0x1 | 1 |
| 2 | 0x2 | 0 |

The node can then map the target identifier to a transport identifier that can then be used to identify the device on the extender transport protocol. The device transport identifier on the extender transport protocol (i.e., the packet-based protocol) can be the same as or different than the generic identifier. Thus, devices attached to one node can be identified to other nodes across the packet-based network.

The method and system of this invention provide a means to define the communications across the extension protocol; i.e., a means to map Fibre Channel data into an extension protocol such that it can be decoded back into a Fibre Channel protocol for communication with a target at a remote SAN. The present invention thus defines a protocol that can be used to encapsulate Fiber Channel in a packet-based network. This is accomplished by converting data to be transmitted from the protocol to be extended (Fibre Channel) to the extension protocol (the packet-based protocol for the particular application) and back to the extended protocol (Fibre Channel) at the remote SAN. The encapsulation protocol of the present invention can be configured to convert specific commands for a given protocol and can be extended to include new commands as the Fibre Channel protocol expands to provide new functionality. Any Fibre Channel commands or messages referenced in the present invention are illustrative, but not exclusive.

The EP layer of the method and system of the present invention is composed of two parts: Aspen Node Management (ANM) and Fibre Channel Protocol—Encapsulation Protocol (FCP-EP). These names have been arbitrarily chosen for descriptive purposes only. ANM can be thought of as the control mechanism. It defines a client server environment so that multiple SANs with multiple initiators and multiple targets can be managed concurrently as individual nodes on, for example, WAN 140 of FIG. 1. In a multi-node environment, one node is designated as a server node and all nodes (including the server node) are clients. The following messages are used to define and manage the ANM control mechanism:

Client Node Register: Used by a client node to register with the server node. This registers the client's EP address to allow the server to open future connections to the client (if necessary).

Client Node Target Register: Used by a client node to register FC targets with the server node. This registers all FC targets found on the local FC network.

Target Table Update: Sent by the server node to update a client's global target table. The Target Table Update contains all entries for all registered clients but does not dictate the format of the table used by a client. Each client can format the Target Table in a format that best optimizes the use of the table by each client node.

Target Address Freeze: Sent by the server node to notify a client node that there is going to be a Target Table Update and all FCP-EP outbound messages should be suspended until the Target Table Update message is received.

Node Acknowledgment: An acknowledgment frame for ANM messages. It is used for flow control purposes.

FCP-EP can be thought of as a data mechanism. It defines the disassembly and reassembly of FCP frames for transport across WAN 140. The FCP-EP layer can itself be a packet-based protocol with payload definitions that are very similar to the payload definitions of SCSI-FCP sequences. During disassembly, the FCP sequences from the local SAN can be divided into smaller packets that are compatible with the lower-level transport protocol being used (e.g., ATM or Ethernet). Message identifiers are used to retain sequence information during disassembly. The disassembled sequences are then combined into frames for transport across the physical link. Once across the link, another node receives these frames and uses the message identifiers to reassemble the FCP sequences. The packets can then be ready for transmission to the local SAN in the same format in which they were originally produced.

The following messages are used to define and manage the FCP-EP data mechanism:

SCSI Command: Contains the information for a new FCP command.

SCSI Command Plus Data: Contains the information for a new FCP command as well as a block of data for the specified FCP command.

SCSI Data Request: Contains information regarding data transfer size for a write request. This message requests an amount of data specified by a Data Size field, starting at a relative offset specified by a Relative Offset field.

SCSI Data: Contains a block of data and is used for reads and writes.

SCSI Data Response: Contains a block of data as well as FCP response information.

SCSI Response: Contains FCP response information.

SCSI Abort Request: Used to notify of an abort condition for an I/O.

SCSI Data Acknowledgement: An acknowledgement frame for FCP-EP messages. It is used for flow control purposes.

The method and system of this invention can be implemented within a Fibre Channel-to-SCSI router such as routers 120, 130 and 150 of FIG. 1 (nodes 120, 130 and 150). The present invention can be implemented purely as software instructions stored within memory within the Fibre Channel-to-SCSI routers and can be easily upgraded as new versions with new functionality are created. No change in the hardware of existing Fibre Channel-to-SCSI routers, is required to incorporate this invention. The memory in which the software instructions of this invention are stored can be RAM (random access memory) or ROM (read-only memory), or other memory storage device.

An implementation of the present invention can include a dynamic discovery mechanism by which each node (router) in a multi-node implementation can communicate with every other node in order to, for example, initially discover the presence of other such nodes within the system. This dynamic discovery mechanism can be used to allow each node to communicate with every other node through a common server. Each node in the network can thus discover the presence of other nodes and communicate to the other nodes what attached targets it has available. Each node can receive this information from every other node and can represent to their own attached hosts, or to technicians configuring each router (node), all of the available targets on all the available nodes.

At least one router (node) must be designated as the server through which this discovery functionality can be implemented. Other routers can also be designated as servers for, for example, fail over and error recovery cases or as a back-up. The server "module," in fact, need not reside within a Fibre Channel-to-SCSI router in the SAN. It could, instead, be a separate device that simply provides the server functionality. A Fibre Channel-to-SCSI router can, however, contain and provide the server function. If the server function is provided by a separate device, the separate server can be integrated into the standard network equipment not within the SAN, and the routers of the SAN can communicate with this server to receive the required information. The server would thus be a true "server," instead of an additional function within a Fibre Channel-to-SCSI router.

The server function of this invention can be analogized to a DNS server within an IP network. The DNS server exists in the network infrastructure and knows how to communicate with the main servers. There is a defined protocol by which the main servers in an IP network can discover each other. The dynamic discovery mechanism of the present invention provides essentially the same function, and can thus be integrated into the network, leaving the Fibre Channel-to-SCSI routers to be simple client nodes that can communicate with one another and with the server to discover information about any other nodes on the network.

The encapsulation protocol method and system of the present invention can be used over existing internet infrastructures and other existing network protocols. For example, the extension protocol can be a typical IP network protocol, an ATM network, gigabit Ethernet, or any protocol that allows data packets to flow between nodes. The method and system of this invention, by encapsulating Fibre Channel SCSI, provide a means by which data can be routed between any SCSI protocol SANs on either end of an extension network. The method and system of this invention define a dynamic way to discover all the nodes available within a network implementation, so that a 1-to-n or an n-to-n relationship can be established between multiple nodes (routers) having multiple targets and initiators. Each node (router) is an access point to its respective SAN.

By encapsulating the Fibre Channel protocol messages, the method and system of this invention extend standardized messages across the intervening WAN 140 in such a way that they can be de-coded at a remote SAN and acted on within the remote SAN without loss or corruption. Standardized messages can thus be extended across WAN 140 from a local SAN to a remote SAN without the need for a proprietary protocol format.

In operation, when a Fibre Channel-to-SCSI router implementing this invention first comes online within a storage area network 110 or 115, it registers with the designated server to identify itself to the network and to receive in exchange information about every other node present on the network, and of the SCSI targets available on each node. Similarly, the designated server can detect when a Fibre Channel-to-SCSI router drops from the network due to maintenance or malfunction. This functionality can be provided with, for example, a heartbeat message within the Fibre Channel SCSI protocol. There is currently no known theoretical limit to the number of nodes a storage area network implementing the present invention can contain. Instead the number of nodes is constrained by hardware limitations, in particular by the amount of memory within a Fibre Channel-to-SCSI router.

The present invention is not limited to use in applications having storage area networks that each use the same Fibre Channel protocol. For example, host 115 and hosts 110 of FIG. 1 can each use a different protocol and still function properly using the encapsulation protocol of the present invention. By encapsulating Fibre Channel SCSI as the intermediary, the present invention provides sufficient information for translation to occur between, for example, a Fibre Channel network on one side of the extender and a parallel SCSI network on the other side of the extender. With sufficient information within the messages of the Fibre Channel protocol being encapsulated, the present invention can perform this translation between any two types of SCSI networks.

In summary, one embodiment of the method of the present invention comprises the following steps: A Fibre Channel-to-SCSI router is brought online, the router communicates with a designated server to identify itself to the network and also to receive information of the other available nodes on the network. The Fibre Channel-to-SCSI router will also receive information on the available devices attached to each of the other network nodes. This process occurs at each node as it comes online on the storage area network. The method and system of the present invention thus determines at each node what other nodes are available and what devices are attached to each of those nodes.

The method of this invention represents each available device at each node as either a single target having one or more LUNs, or as a group of targets with one or more LUNs, and makes designed devices available to all other hosts on the local storage area network. This means that each node coming online represents the reported devices on other nodes in such a way that they are made available to its own hosts.

Communications from hosts attached to a Fibre Channel-to-SCSI router coming online can then be encapsulated and sent across to available devices over the extender through WAN 140 and, similarly, encapsulated messages can be received at the local node and passed on to its local hosts. This invention can thus encapsulate the I/O phases between a local host and remote devices that are made available to the host. The I/O phases encapsulated between a local host and a remote device can include, for example, a command phase, a data phase and a response phase.

A host can thus send a command which is encapsulated by its associated Fibre Channel-to-SCSI router (node) and forwarded over the extender (WAN 140) to a remote node associated with the device for which the command is intended. The remote node will de-encapsulate the command and forward it to the intended device. The device may then send back data or a response, or data and a response, which are then encapsulated by the remote node and sent to the node associated with the initiator (host) sending the command. The node associated with the initiating host receives and de-encapsulates the response or data, or combination of the two, and forwards them to the host. This sequence of command, data and/or response can comprise an I/O phase to be encapsulated. The present invention provides the encapsulation protocol but does not alter the data transmitted between host and device in any other way.

The step of encapsulating the I/O phases between a local host and a remote device is repeated as necessary for subsequent I/Os. Encapsulation can be performed between multiple hosts attached to multiple nodes communicating with multiple devices, all associated with multiple local or remote SANs. In this way, the method and system of this invention establish an initial network configuration and maintain communication between local routers in a local SAN and remote routers at one or more remote SANs, or between other local routers within the same SAN.

The step of encapsulating the I/O phases can further comprise encapsulating individual commands and messages for a given Fibre Channel, SCSI or other protocol. For example, task management functions, error recovery functions, and other I/O processing functions can be encapsulated. Furthermore, the method and system of this invention can be easily expanded to provide the same encapsulation function for additional commands and messages that may be added to existing protocols.

The present invention provides the capability for extending an SAN model to many SANs over distances much greater than those currently allowed by the Fibre Channel protocol. This invention provides the capability to interconnect SANs in geographically diverse locations, such as different cities, in such a way that they can function in a seamless manner as if they comprise a single local SAN. Further, for storage recovery purposes, the present invention allows a back-up library to reside off-site at a remote location, thus ensuring data integrity should the local location be damaged by some failure or disaster.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for encapsulating SCSI protocol for data transmission between two or more nodes across a packet-based network, comprising, at each node:
   (a) identifying all other available nodes, and remote devices attached to each of said nodes, on said network;
   (b) representing one or more of said remote devices such that they are made available to one or more local hosts;
   (c) encapsulating an input/output (I/O) phase between one or more of said local hosts and one or more of said remote devices according to a packet-based protocol, wherein messages corresponding to the I/O phase are received by that node according to a second protocol that is different than the packet-based protocol; and
   (d) repeating step (c) for subsequent I/O phases;
   wherein neither the one or more hosts nor the one or more remote devices communicate messages corresponding to the I/O phase using the packet-based protocol.

2. The method of claim 1, wherein said input/output phase comprises a command phase, a data phase and a response phase.

3. The method of claim 1, wherein encapsulating said I/O phase comprises encapsulating an individual command for a Fibre Channel or SCSI protocol.

4. The method of claim 3, wherein said individual command is a task management function, an error recovery function or other I/O processing function.

5. The method of claim 1, wherein each of said two or more nodes is communicatively connected to a Storage Area Network ("SAN").

6. The method of claim 5, wherein each of said two or more nodes is an interface between its SAN and said packet-based network.

7. The method of claim 5, wherein one of said SANs is a back-up library.

8. The method of claim 1, wherein each of said nodes is a Fibre-Channel-to-SCSI router.

9. The method of claim 1, wherein said second protocol is a Fibre Channel protocol.

10. The method of claim 1, wherein said packet-based network is an Asynchronous Transfer Mode ("ATM") network, an Ethernet network, an IP network or a SONET network.

11. The method of claim 1, wherein said packet-based network is a wide are network ("WAN").

12. The method of claim 1, wherein said packet-based network is a dedicated link.

13. The method of claim 1, wherein said packet-based network is a switched network.

14. The method of claim 1, wherein said representing step further comprises the steps of:
   mapping a local address for each of one or more of said remote devices attached to a node to an intermediate address; and
   mapping each of said intermediate addresses into a remote address at another node.

15. The method of claim 1, wherein said encapsulating step further comprises the steps of:
   converting said I/O phase from said SCSI protocol to a protocol associated with said packet-based network; and
   converting back said I/O phase to said SCSI protocol at a remote node.

16. The method of claim 15, wherein said protocol associated with said packet-based network is an Asynchronous Transfer Mode ("ATM") protocol, an Ethernet protocol, an IP protocol or a SONET protocol.

17. The method of claim 1, wherein said identifying step further comprises dynamically discovering all other available nodes, and the devices attached to said nodes, through a common server.

18. The method of claim 17, wherein at least one of said two or more nodes is designated as said common server.

19. The method of claim 17, wherein said common server is a separate device from said nodes.

20. The method of claim 17, further comprising a heart-beat message for determining, at said common server, if a node drops from said network.

21. The method of claim 1, wherein said packet-based network is any network that allows data packets to flow between nodes.

22. The method of claim 1, wherein different ones of said two or more nodes can be communicatively connected to a SAN using different network protocols.

23. A system for encapsulating SCSI protocol for data transmission between two or more nodes across a packet-based network, comprising, at each node, a set of instructions stored on a computer readable medium further comprising:
   (a) instructions for identifying all other available nodes, and remote devices attached to each of said nodes, on said network;
   (b) instructions for representing one or more of said remote devices such that they are made available to one or more local hosts;
   (c) instructions for encapsulating an input/output (I/O) phase between one or more of said local hosts and one or more of said remote devices according to a packet-based protocol, wherein messages corresponding to the I/O phase are received by that node according to a second protocol that is different than the packet-based protocol; and
   (d) instructions for repeating step (c) for subsequent I/O phases;

wherein neither the one or more hosts nor the one or more remote devices communicate messages corresponding to the I/O phase using the packet-based protocol.

24. The system of claim 23, wherein said input/output phase comprises a command phase, a data phase and a response phase.

25. The system of claim 23, wherein all instructions are stored in memory within each of said nodes.

26. The system of claim 23, wherein said instructions for encapsulating said I/O phase comprise instructions for encapsulating an individual command for a Fibre Channel or SCSI protocol.

27. The system of claim 26, wherein said individual command is a task management function, an error recovery function or other I/O processing function.

28. The system of claim 23, further comprising a Storage Area Network ("SAN") communicatively connected to each of said two or more nodes.

29. The system of claim 28, wherein each of said two or more nodes is an interface between its SAN and said packet-based network.

30. The system of claim 28, wherein at least one of said SANs is a back-up library.

31. The system of claim 23, wherein each of said nodes is a Fibre-Channel-to-SCSI router.

32. The system of claim 23, wherein said SCSI protocol is a Fibre Channel SCSI protocol.

33. The system of claim 23, wherein said packet-based network is an Asynchronous Transfer Mode ("ATM") network, an Ethernet network, an IP network or a SONET network.

34. The system of claim 23, wherein said packet-based network is a wide are network ("WAN").

35. The system of claim 23, wherein said packet-based network is a dedicated link.

36. The system of claim 23, wherein said packet-based network is a switched network.

37. The system of claim 23, wherein said instructions for representing further comprise:
instructions for mapping a local address, for each of one or more of said remote devices attached to a node, to an intermediate address; and
instructions for mapping each of said intermediate addresses into a remote address at another node.

38. The system of claim 23, further comprising:
instructions for converting said I/O phase from said SCSI protocol to a protocol associated with said packet-based network: and
instructions for converting back said I/O phase to said SCSI Protocol at a remote node,
wherein said protocol associated with said packet-based network is an Asynchronous Transfer Mode ("ATM") protocol, an Ethernet protocol, an IP protocol or a SONET protocol.

39. The system of claim 23, further comprising a common server, and wherein said instructions for identifying further comprise instructions for dynamically discovering all other available nodes, and the devices attached to said nodes, through said common server.

40. The system of claim 39, wherein at least one of said two or more nodes is designated as said common server.

41. The system of claim 39, wherein said common server is a separate device from said nodes.

42. The system of claim 39, further comprising instructions for a heartbeat message to determine, at said common server, if a node drops from said network.

43. The system of claim 23, wherein said packet-based network is any network that allows data packets to flow between nodes.

44. The system of claim 23, wherein different ones of said two or more nodes can be communicatively connected to a SAN using different network protocols.

45. A method for encapsulating a first protocol for data transmission between two or more nodes across a network, comprising, at each node:
identifying all other available nodes, and remote devices attached to each of said nodes, on said network;
representing one or more of said remote devices such that said one or more of said remote devices are available to a local host;
encapsulating an input/output (I/O) phase between said local host and said one or more of said remote devices according to a packet-based protocol, wherein messages corresponding to the I/O phase are received by that node according to a second protocol that is different than the packet-based protocol; and
repeating encapsulating said I/O phase for a subsequent I/O phase;
wherein neither the one or more hosts nor the one or more remote devices communicate messages corresponding to the I/O phase using the packet-based protocol.

46. The method of claim 45, wherein said input/output phase comprises a command phase, a data phase and a response phase.

47. The method of claim 45, wherein encapsulating said I/O phase comprises encapsulating an individual command for a Fibre Channel protocol.

48. The method of claim 47, wherein said individual command is a task management function, an error recovery function or other I/O processing function.

49. The method of claim 45, wherein encapsulating said I/O phase comprises encapsulating an individual command for a SCSI protocol.

50. The method of claim 49, wherein said individual command is a task management function, an error recovery function or other I/O processing function.

51. The method of claim 49, wherein each of said two or more nodes is communicatively connected to a Storage Area Network ("SAN").

52. The method of claim 51, wherein each of said two or more nodes is an interface between its SAN and said packet-based network.

53. The method of claim 51, wherein one of said SANs is a back-up library.

54. The method of claim 45, wherein each of said nodes is a Fibre-Channel-to-SCSI router.

55. The method of claim 45, wherein said first protocol is a Fibre Channel SCSI protocol.

56. The method of claim 45, wherein said network is an Asynchronous Transfer Mode ("ATM") network, an Ethernet network, an IP network or a SONET network.

57. The method of claim 45, wherein said network is a wide area network ("WAN").

58. The method of claim 45, wherein said network is a dedicated link.

59. The method of claim 45, wherein said network is a switched network.

60. The method of claim 45, wherein representing further comprises:
mapping a local address for each of said one or more of said remote devices to a corresponding intermediate address; and mapping said corresponding intermediate address into a corresponding remote address at another node.

61. The method of claim 45, wherein encapsulating further comprises:
converting said I/O phase from said first protocol to a second protocol associated with said network; and
converting back said I/O phase to said first protocol at a remote node.

62. The method of claim 61, wherein said second protocol is an Asynchronous Transfer Mode ("ATM") protocol, an Ethernet protocol, an IP protocol or a SONET protocol.

63. The method of claim 45, wherein identifying further comprises dynamically discovering all other available nodes, and said remote devices attached to said nodes, through a common server.

64. The method of claim 63, wherein at least one of said two or more nodes is designated as said common server.

65. The method of claim 63, wherein said common server is separate from said nodes.

66. The method of claim 63, further comprising detecting a heartbeat message for determining, at said common server, if a node drops from said network.

67. The method of claim 45, wherein said network is any packet-based network that allows data packets to flow between nodes.

68. The method of claim 45, wherein different ones of said two or more nodes can be communicatively connected to a SAN using different network protocols.

69. The method of claim 45, wherein said first protocol is a SCSI protocol.

70. A computer readable medium having software embedded therein for using a system for encapsulating a first protocol for a data transmission between two or more nodes across a network, the computer readable medium comprising:
instructions for identifying all other available nodes, and remote devices attached to each of said nodes, on said network;
instructions for representing one or more of said remote devices such that said one or more of said remote devices are available to a local host;
instructions for encapsulating an input/output (I/O) phase between said local host and said one or more of said remote devices according to a packet-based protocol, wherein messages corresponding to the I/O phase are received by that node according to a second Protocol that is different than the packet-based protocol; and
instructions for repeating said instructions for encapsulating for a subsequent I/O phase;
wherein neither the one or more hosts nor the one or more remote devices communicate messages corresponding to the I/O phase using the packet-based protocol.

71. The computer readable medium of claim 70, wherein said input/output phase comprises a command phase, a data phase and a response phase.

72. The computer readable medium of claim 70, wherein each of said nodes comprises a corresponding computer readable medium comprising such software including such instructions.

73. The computer readable medium of claim 70, wherein said instructions for encapsulating said I/O phase comprise instructions for encapsulating an individual command for a Fibre Channel protocol.

74. The computer readable medium of claim 73, wherein said individual command is a task management function, an error recovery function or other I/O processing function.

75. The computer readable medium of claim 70, wherein said instructions for encapsulating said I/O phase comprise instructions for encapsulating an individual command for a SCSI protocol.

76. The computer readable medium of claim 75, wherein said individual command is a task management function, an error recovery function or other I/O processing function.

77. The computer readable medium of claim 70, wherein the system further comprises a Storage Area Network ("SAN") communicatively connected to each of said two or more nodes.

78. The computer readable medium of claim 77, wherein each of said two or more nodes is an interface between its SAN and said packet-based network.

79. The computer readable medium of claim 77, wherein at least one of said SANs is a back-up library.

80. The computer readable medium of claim 70, wherein each of said nodes is a Fibre-Channel-to-SCSI router.

81. The computer readable medium of claim 70, wherein said first protocol is a Fibre Channel SCSI protocol.

82. The computer readable medium of claim 70, wherein said network is an Asynchronous Transfer Mode ("ATM") network, an Ethernet network, an IP network or a SONET network.

83. The computer readable medium of claim 70, wherein said network is a wide area network ("WAN").

84. The computer readable medium of claim 70, wherein said network is a dedicated link.

85. The computer readable medium of claim 70, wherein said network is a switched network.

86. The computer readable medium of claim 70, wherein said instructions for representing further comprise:
instructions for mapping a local address, for each of one or more of said remote devices attached to a node, to a corresponding intermediate address; and
instructions for mapping each of said corresponding intermediate addresses into a corresponding remote address at another node.

87. The computer readable medium of claim 70, wherein said software further comprises:
instructions for converting said I/O phase from said first protocol to a second protocol associated with said network; and
instructions for converting back said I/O phase to said first protocol at a remote node.

88. The computer readable medium of claim 87, wherein said second protocol is an Asynchronous Transfer Mode ("ATM") protocol, an Ethernet protocol, an IP protocol or a SONET protocol.

89. The computer readable medium of claim 70, wherein the system further comprises a common server, and wherein said instructions for identifying further comprise instructions for dynamically discovering all other available nodes, and said remote devices attached to said nodes, through said common server.

90. The computer readable medium of claim 89, wherein at least one of said two or more nodes is designated as said common server.

91. The computer readable medium of claim 89, wherein said common server is separate from said nodes.

92. The computer readable medium of claim 89, further comprising instructions for detecting a heartbeat message to determine, at said common server, if a node drops from said network.

93. The computer readable medium of claim 70, wherein said network is any packet-based network that allows data packets to flow between nodes.

94. The computer readable medium of claim 70, wherein different ones of said two or more nodes can be communicatively connected to a SAN using different network protocols.

95. The computer readable medium of claim 70, wherein said first protocol is a SCSI protocol.

96. The system of claim 24, wherein said instructions for encapsulating further comprise:
   instructions for converting said I/O phase from said SCSI protocol to a protocol associated with said packet-based network; and
   instructions for converting back said I/O phase to said SCSI protocol at a remote node.

97. A system for extending Fibre Channel networks comprising:
   a packet-based network operating according to a packet-based protocol;
   a first Fibre Channel network;
   a second Fibre Channel network;
   a first node connected to the first Fibre Channel Network and the packet-based network;
   a second node connected to the Second Fibre Channel Network and the packet-based network;
   wherein the first node is operable to:
      discover the second node connected to the packet-based network and a remote device connected to the second node;
      represent the remote device to a host connected to the first node via the first Fibre Channel Network;
      receive a first message corresponding to an I/O phrase from the host to the remote device, wherein the first message formatted according to a fibre channel protocol;
      encapsulate the first message according to the packet-based protocol;
      forward the first message encapsulated according to the packet-based protocol to the second node via the packet-based network;
      receive a second message encapsulated according to the packet-based protocol from the second node via the packet-based network; and
      forward the second message to the host according to the Fibre Channel protocol via the first Fibre Channel network;
   wherein the second node is operable to:
      receive the first message corresponding to an I/O phrase from the first node according to the packet-based protocol;
      forward the first message to the remote device according to the Fibre Channel protocol via the second Fibre Channel network;
      receive the second message corresponding to the I/O phase according to the Fibre Channel from the remote device protocol via the second Fibre Channel network;
      encapsulate the second message according to the packet-based protocol;
      forward the second message encapsulated according to the packet-based protocol to the first node via the packet-based network; and
      forward the second message to the host according to the Fibre Channel protocol via the first Fibre Channel network.

* * * * *